(12) United States Patent
Fuqua et al.

(10) Patent No.: US 8,622,173 B2
(45) Date of Patent: Jan. 7, 2014

(54) CONVERTIBLE DECK DEPLOYMENT SYSTEM, AND METHOD FOR TRANSFERRING PERSONNEL BETWEEN SPACED ELEVATIONS

(75) Inventors: Charles Louis Fuqua, Woodbridge, VA (US); Steven Scott Kahre, Spotsylvania, VA (US)

(73) Assignee: Patriot3, Inc., Fredericksburg, VA (US)

( * ) Notice: Subject to any disclaimer, the term of this patent is extended or adjusted under 35 U.S.C. 154(b) by 399 days.

(21) Appl. No.: 12/449,884

(22) PCT Filed: Aug. 21, 2007

(86) PCT No.: PCT/US2007/018564
§ 371 (c)(1),
(2), (4) Date: Feb. 1, 2010

(87) PCT Pub. No.: WO2009/025642
PCT Pub. Date: Feb. 26, 2009

(65) Prior Publication Data
US 2010/0147622 A1  Jun. 17, 2010

(51) Int. Cl.
*E06C 5/00* (2006.01)

(52) U.S. Cl.
USPC .......... 182/63.1; 182/64.1; 182/69.6; 182/77; 182/78

(58) Field of Classification Search
USPC ......... 182/63.1, 64.1, 69.6, 77, 78, 79, 80, 81
See application file for complete search history.

(56) References Cited

U.S. PATENT DOCUMENTS

| | | | | |
|---|---|---|---|---|
| 309,951 A | * | 12/1884 | Hoffman | 211/153 |
| 479,436 A | | 7/1892 | Lummus | |
| 849,340 A | * | 4/1907 | Schwab | 193/12 |
| 867,092 A | * | 9/1907 | Ashford | 182/86 |
| 1,115,803 A | * | 11/1914 | Gallagher | 182/27 |
| 1,419,834 A | | 6/1922 | Fellows | |
| 1,455,928 A | * | 5/1923 | Morrill | 182/86 |
| 2,362,170 A | * | 11/1944 | Swaisgood | 182/1 |
| 2,828,166 A | * | 3/1958 | Herring | 182/101 |
| 3,454,131 A | * | 7/1969 | Johnson et al. | 182/115 |
| 3,565,212 A | * | 2/1971 | Johnson | 182/222 |
| 3,731,761 A | * | 5/1973 | Glenn | 182/1 |
| 3,779,596 A | * | 12/1973 | Ritter | 296/179 |
| 3,837,427 A | * | 9/1974 | Mattinson | 182/115 |
| 3,910,264 A | | 10/1975 | Mahieu | |
| 4,004,652 A | * | 1/1977 | Laboy-Alvarado | 182/118 |
| 4,125,173 A | * | 11/1978 | Rust et al. | 182/69.6 |
| 4,171,033 A | | 10/1979 | Rust et al. | |
| 4,222,140 A | * | 9/1980 | Olewinski et al. | 14/71.3 |
| 4,284,173 A | * | 8/1981 | Patterson | 184/1.5 |

(Continued)

*Primary Examiner* — Alvin Chin Shue
*Assistant Examiner* — Colleen M Chavchavadze
(74) *Attorney, Agent, or Firm* — Schwartz Law Firm, P.C.

(57) ABSTRACT

A deck deployment system is adapted to facilitate transfer of personnel between spaced elevations. The deck deployment system includes a deck defining a substantially flat and continuous deck surface for supporting personnel. A convertible stairway is hinged to the deck and adapted for movement between a stowed condition and a deployed condition. The convertible stairway includes an adjustable frame assembly and a series of articulating horizontally-disposed foot treads carried by the frame assembly. The foot treads remain substantially horizontal upon movement of the stairway between the stowed condition and the deployed condition. When the stairway is in the stowed condition, the foot treads integrate with the deck to form a substantially flat and continuous portion of the deck surface. When the stairway is in the deployed condition, the foot treads cooperate to form steps extending from the deck to an elevation spaced from the deck surface.

7 Claims, 9 Drawing Sheets

(56) References Cited

U.S. PATENT DOCUMENTS

| | | | |
|---|---|---|---|
| 4,642,953 A * | 2/1987 | DeGood | 52/183 |
| 4,679,657 A | 7/1987 | Bennett et al. | |
| 5,555,953 A * | 9/1996 | Henderson | 182/141 |
| 5,937,971 A | 8/1999 | Storm | |
| 6,802,391 B2 * | 10/2004 | Ganiere | 182/69.6 |
| 6,832,667 B1 * | 12/2004 | Kahre et al. | 182/127 |
| 7,836,536 B2 * | 11/2010 | Motohashi et al. | 14/71.5 |
| 2009/0301813 A1 * | 12/2009 | Chantelois et al. | 182/64.1 |

\* cited by examiner

CONVERTIBLE DECK DEPLOYMENT SYSTEM, AND METHOD FOR TRANSFERRING PERSONNEL BETWEEN SPACED ELEVATIONS

TECHNICAL FIELD AND BACKGROUND

The present disclosure relates broadly to a convertible deck deployment system, and method for transferring personnel between spaced elevations.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification.

According to one exemplary embodiment, a deck deployment system is adapted to facilitate transfer of personnel between spaced elevations. The deck deployment system includes a deck defining a substantially flat and continuous deck surface for supporting personnel. A convertible stairway is hinged to the deck and adapted for movement between a stowed condition and a deployed condition. The convertible stairway includes an adjustable frame assembly and a series of articulating horizontally-disposed foot treads carried by the frame assembly. The foot treads remain substantially horizontal upon movement of the stairway between the stowed condition and the deployed condition. When the stairway is in the stowed condition, the foot treads integrate with the deck to form a substantially flat and continuous portion of the deck surface. When the stairway is in the deployed condition, the foot treads cooperate to form steps extending from the deck to an elevation spaced from the deck surface.

According to another exemplary embodiment, each of the foot treads defines a substantially planar rectangular surface comprising opposing front and back ends and opposing side ends.

According to another exemplary embodiment, the adjustable frame assembly incorporates cooperating pairs of laterally-spaced tread support rails and laterally-spaced tread adjustment rails. Each of the foot treads is connected to the tread support rails at opposite side ends of the foot tread proximate the back end of the foot tread, and to the tread adjustment rails at opposite side ends of the foot tread proximate the front end of the foot tread.

According to another exemplary embodiment, a base platform is located below the deck and adapted for supporting the stairway in the deployed condition.

According to another exemplary embodiment, a fixed personnel ladder extends between the base platform and the deck.

According to another exemplary embodiment, at least one handrail is located at a perimeter of the deck surface.

According to another exemplary embodiment, the convertible stairway in the deployed condition forms a central deployment passage in the deck. The deployment passage may be entirely surrounded by the deck surface.

According to another exemplary embodiment, a vehicle-mount frame assembly is attached to the deck and adapted for mounting the deck on a tactical vehicle.

According to another exemplary embodiment, an adjustable end ramp is attached to the deck.

In another exemplary embodiment, the invention comprises a tactical vehicle which incorporates a deck deployment system, as described herein. The term "tactical vehicle" refers broadly herein to any self-propelled, boosted, or towed military and non-military (e.g., police) conveyance capable of transport by land, sea, or air. The vehicle may have wheels, tracks, skids, floats, and/or other maneuvering structure.

In yet another exemplary embodiment, the invention comprises a method for transferring personnel between spaced elevations. The method includes, from a deck mounted on a tactical vehicle and comprising a deck surface for supporting personnel, moving a convertible stairway attached to the deck from a stowed condition to a deployed condition. In the stowed condition, the stairway integrates with the deck to form a substantially flat and continuous portion of the deck surface. In the deployed condition, the stairway converts to form steps extending from the deck to an elevation spaced from the deck surface. The stairway is utilized by personnel in the deployed condition to transfer between the deck surface and the spaced elevation.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at lease one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
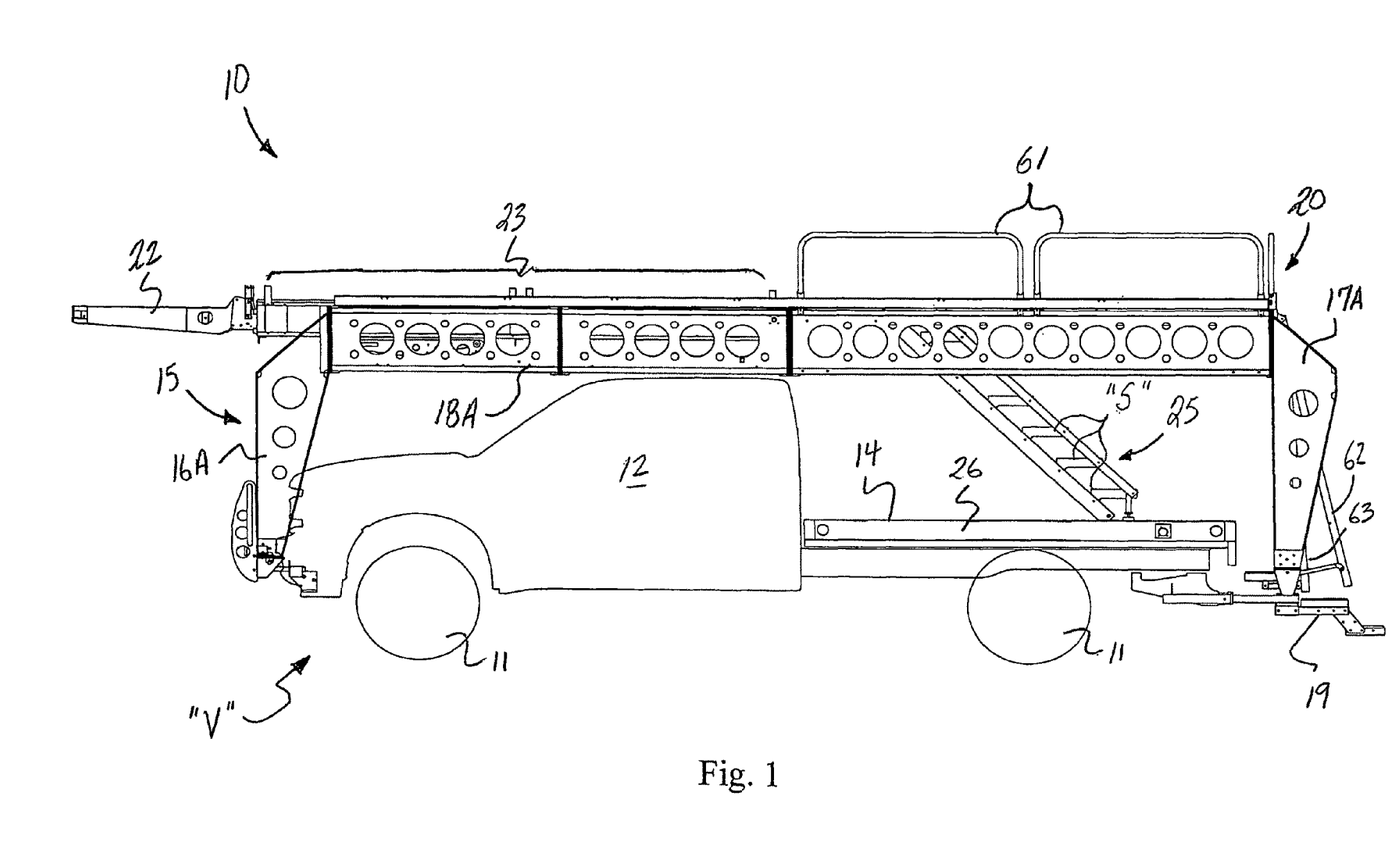
FIG. 1 is a side elevation of a tactical motor vehicle incorporating a rear deck deployment system according to one exemplary embodiment of the present invention.

Referring now specifically to the drawings, a tactical self-propelled motor vehicle "V" incorporating a rear deck deployment system according to one exemplary embodiment of the present invention is illustrated in FIG. 1. The deck deployment system is indicated generally at reference numeral 10. In addition to the system 10, the tactical vehicle "V" may comprise wheels 11, a cab portion 12, and a rear bed 14, and other generally conventional parts and assemblies (not shown) including, for example, a heavy duty chassis, suspension, engine, clutch, gears, differential, drive shaft, driveline, drive train, transmission, and axles.

Figure 2:
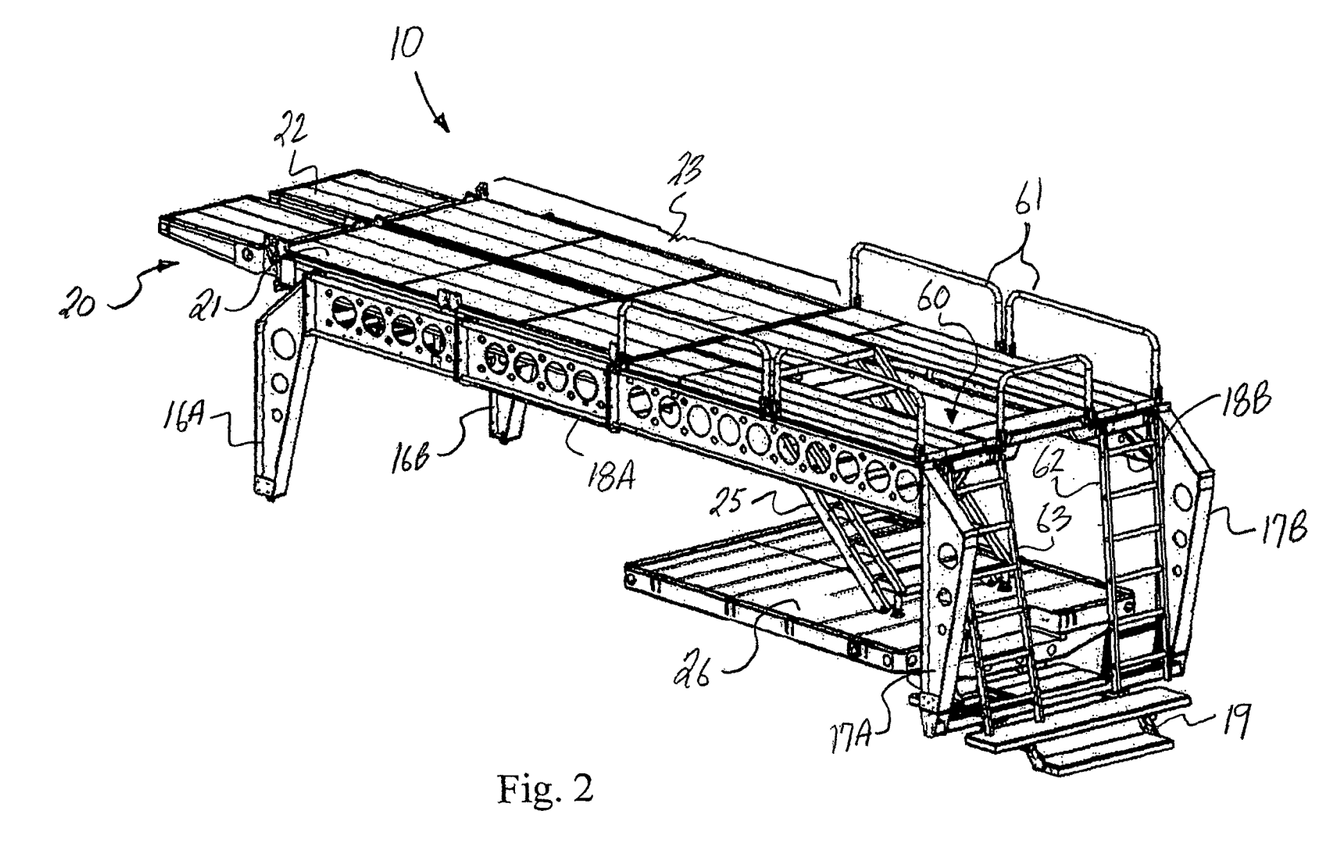
FIG. 2 is a perspective view of the deck deployment system removed from the vehicle, and showing the convertible stairway in a deployed condition extending between the deck surface and the lower platform.
Figure 3:
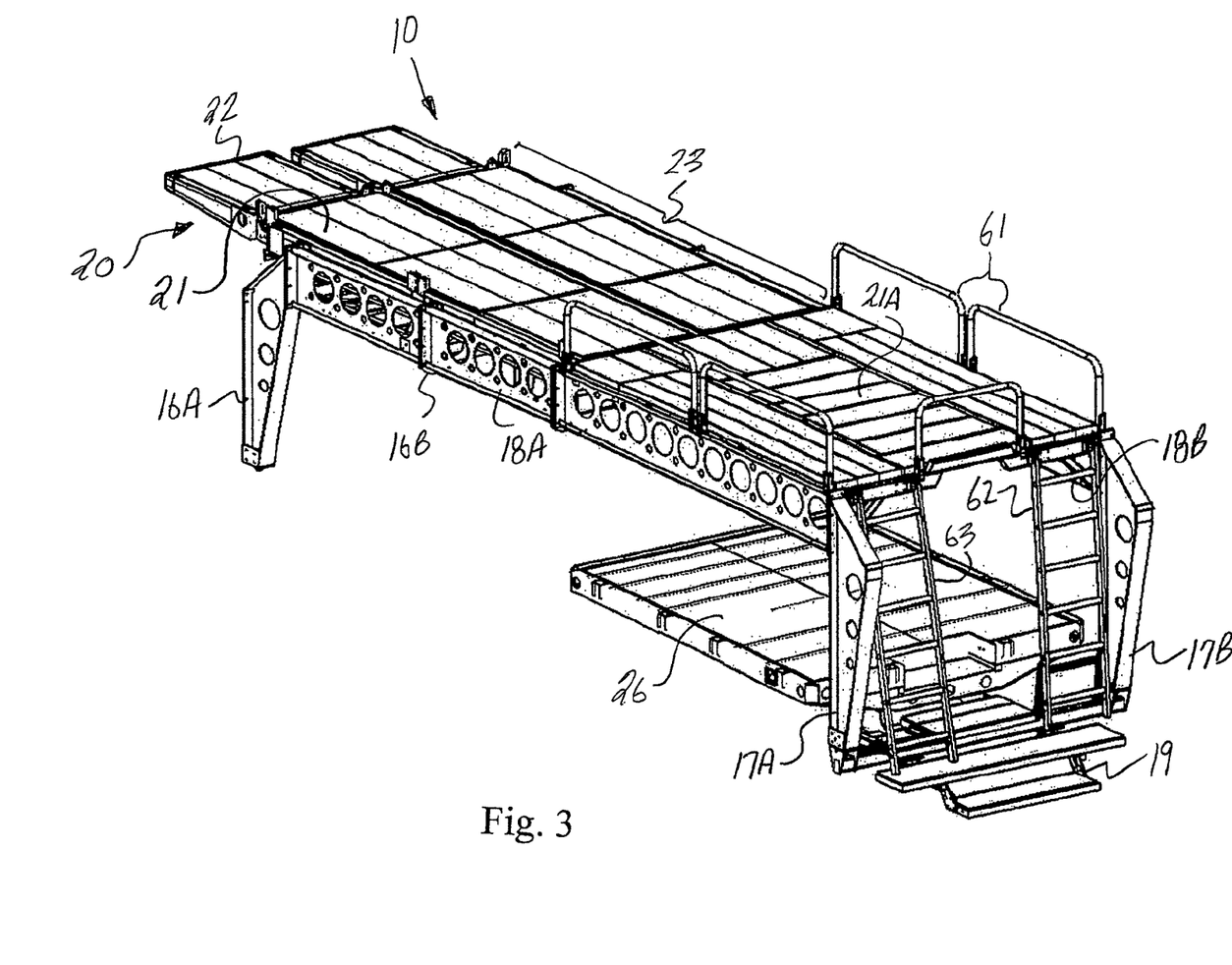
FIG. 3 is a perspective view of the deck deployment system removed from the vehicle, and showing the convertible stairway in the stowed condition.

As best shown in FIGS. 1, 2, and 3, the deck deployment system 10 includes a vehicle-mount frame assembly 15 incorporating front and rear vertical supports 16A, 16B, 17A, 17B and opposing horizontal side beams 18A, 18B. Each side beam 18A, 18B may comprise a single integrally-formed structural element or a series of elements bolted or welded together (or otherwise attached) end-to-end between a cooperating pair of front and rear vertical supports 16A, 17A and 16B, 17B. The side beams 18A, 18B may attach to respective pairs of vertical supports 16A, 17A and 16B, 17B by bolts, rivets, welding, or other suitable means. The front vertical supports 16A, 16B may attach to a front of the vehicle "V" using, for example, mounting brackets, plates and other hardware. The rear vertical supports 17A, 17B mount to a step assembly 19 attached to the vehicle chassis.

An elevated personnel deck 20 is carried by the vehicle-mount frame assembly 15, and defines a substantially flat and continuous deck surface 21 for supporting personnel. In one embodiment, the elevated deck 20 extends from the front to the rear of the vehicle "V", and may comprise a cantilevered adjustable front ramp 22 and pivoted deck section 23 (or main ramp) designed to elevate via one or more hydraulic actuators (not shown). One example of an adjustable front end ramp system applicable for use in the present vehicle is described in Applicant's prior issued patent, U.S. Pat. No. 6,832,667. The complete disclosure of this prior patent is incorporated herein by reference.

In the exemplary embodiment shown, a convertible hinged stairway 25 is located at a rear section of the deck 20 in an area generally above the vehicle bed 14. The vehicle bed 14 may be formed by (or include) a separately attached base platform 26 vertically spaced from the deck 20 at an elevation closer to the road or ground surface. As demonstrated in FIGS. 2 and 3, the convertible stairway 25 is designed to pivot between a deployed condition (FIG. 2), wherein the stairway 25 extends from the elevated deck 20 to the platform 26, and a stowed condition shown in FIG. 3.

Figure 4:
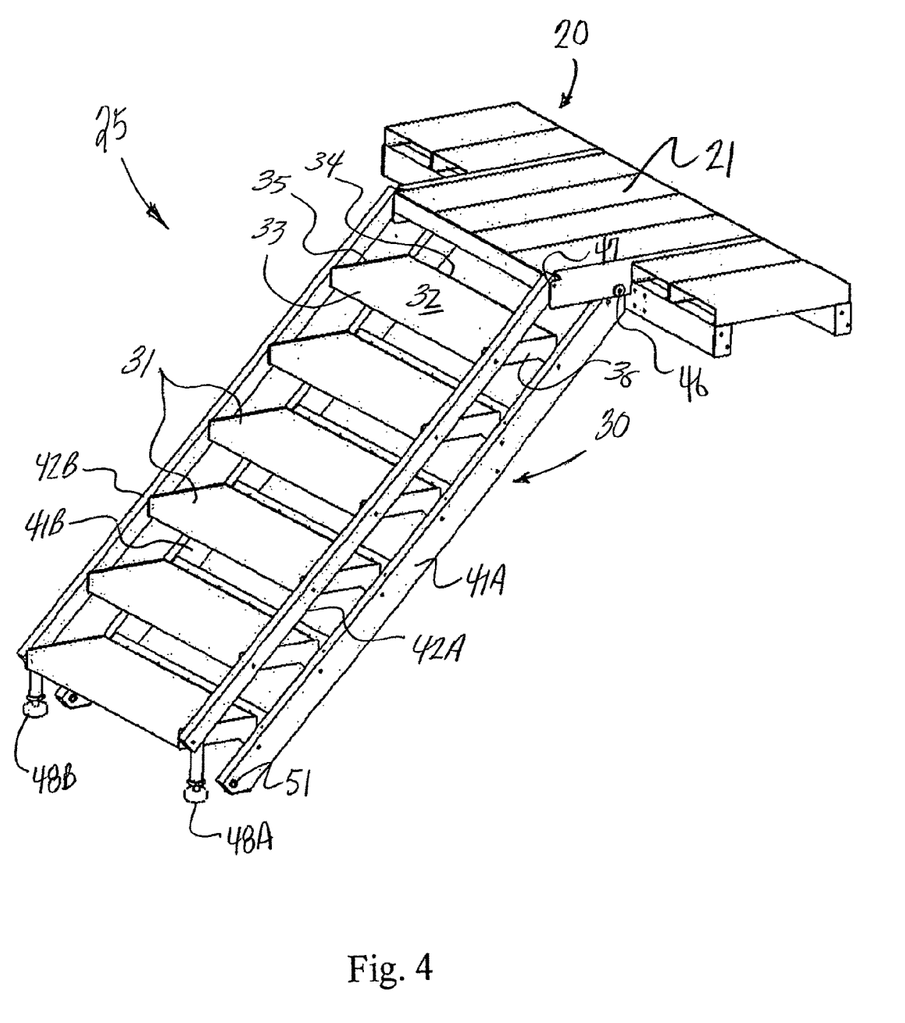
FIG. 4 is a perspective view of the convertible stairway and an adjacent portion of the deck, and showing the stairway in the deployed condition.
Figure 5:
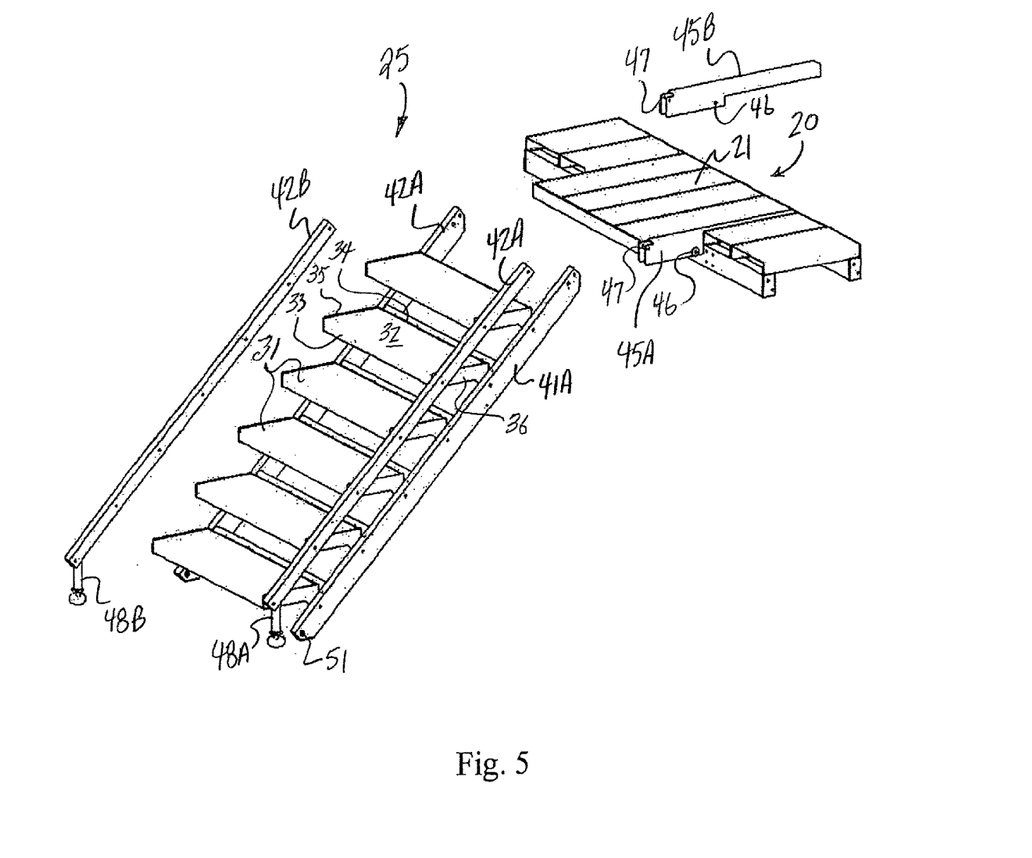
FIG. 5 is a further perspective view of the convertible stairway with various components exploded away.

Referring to FIGS. 4 and 5, the convertible stairway 25 is constructed of an adjustable frame assembly 30 and a series of articulating horizontally-disposed foot treads 31 carried by the frame assembly 30. In the present exemplary embodiment, each foot tread 31 defines a substantially planar and continuous rectangular surface 32 including opposing front and back ends 33, 34 and opposing side ends 35, 36. The top surface 32 of each foot tread 31 may be perforated and/or textured. The adjustable frame assembly 30 includes cooperating pairs of laterally-spaced tread support rails 41A, 41B and tread adjustment rails 42A, 42B. Each of the foot treads 31 may be pivotably connected to the tread support rails 41A, 41B at opposite side ends 35, 36 of the foot tread 31 proximate the back end 34, and to the tread adjustment rails 42A, 42B at opposite side ends 35, 36 proximate the front end 33 of the foot tread 31. The tread support and adjustment rails 41A, 41B, 42A, 42B are each pivotably attached to respective stairway mount channels 45A, 45B affixed to the elevated deck 20. Each stairway mount channel 45A, 45B defines two spaced connecting points 46 and 47—one for pivotably attaching the tread support rail 41 and the other for pivotably attaching the tread adjustment rail 42. Stabilizing feet 48A, 48B may be located at respective free ends of the tread adjustment rails 42A, 42B for engaging the platform 26 and further stabilizing the stairway 25 in the deployed condition.

Figure 6:
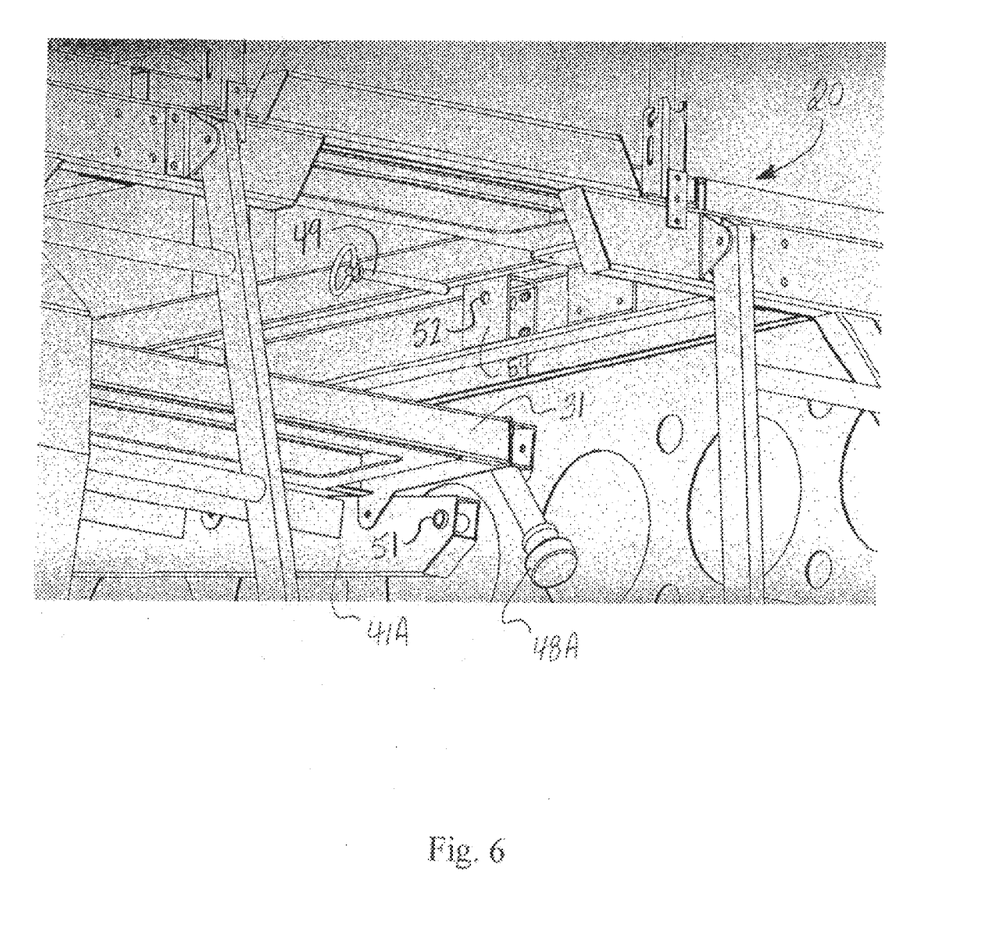
FIG. 6 is an enlarged, fragmentary view of the deck showing the removable retention pin applicable for locking the stairway in the stowed condition.

In one exemplary implementation, the foot treads 31 remain substantially horizontal upon pivoting movement of the stairway 25 between the stowed and deployed conditions. As such, when the stairway 25 is in the stowed condition, as shown in FIG. 3, the foot treads 31 integrate with the deck 20 to form a substantially flat and continuous portion 21A of the deck surface 21. The stairway 25 may be secured in this condition by removable pins (e.g., pin 49 shown in FIG. 6) passed through respective pin holes 51, 52 formed with the tread support rails 41A, 41B and through mounting plates (e.g., plate 54 in FIG. 6) fixed to the deck 20. To convert the stairway 25, the pins 49 are removed and one or more gas springs (not shown) operate to lower the stairway 25 in a controlled manner to the deployed condition shown in FIG. 2. When the stairway 25 is deployed, the foot treads 31 cooperate to form steps "S", shown in FIG. 1, extending from the elevated deck 20 to the platform 26. In this condition, the convertible stairway 25 forms a central or core deployment passage 60 (See FIG. 2) in the deck 20. The deployment passage 60 may be entirely or partially surrounded by the deck surface 21. Additionally, one or more handrails 61 (or safety rails) may be located at a perimeter of the elevated deck 20 adjacent the deployment passage 60. As a further means of transferring personnel to and from the elevated deck 20, the vehicle "V" may include a pair of rear stationary (fixed) ladders 62, 63.

Figure 7:
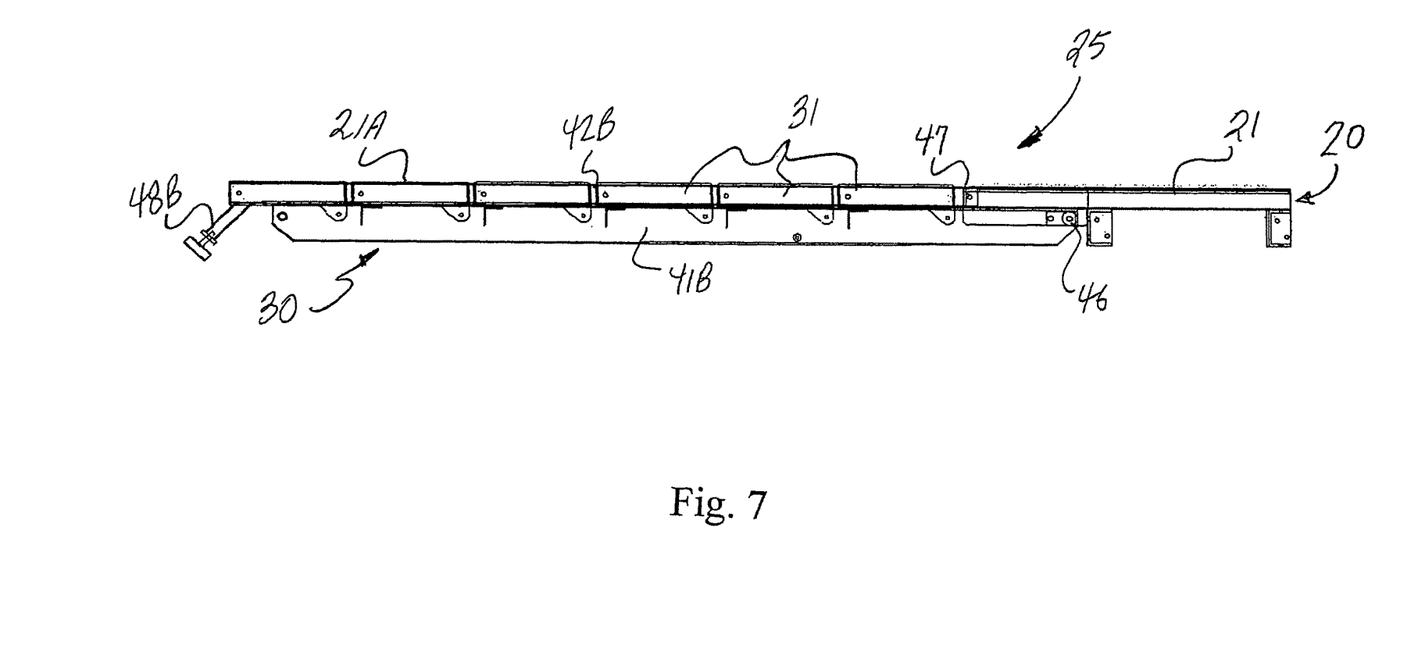
FIGS. 7, 8, and 9 are sequential side views of the convertible stairway demonstrating its conversion from a substantially flat and continuous deck surface to a fully deployed stairway.
Figure 8:
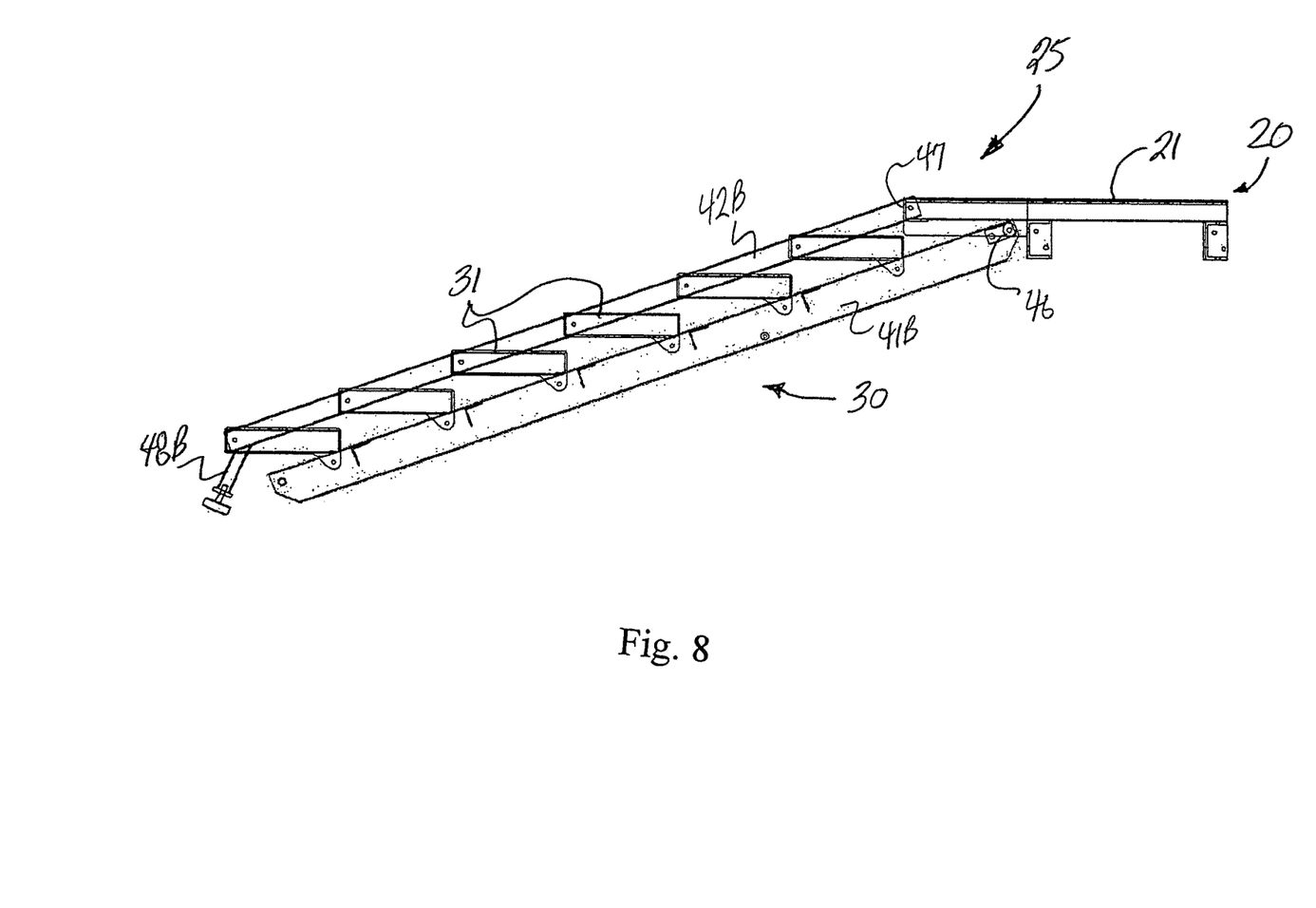
Figure 9:
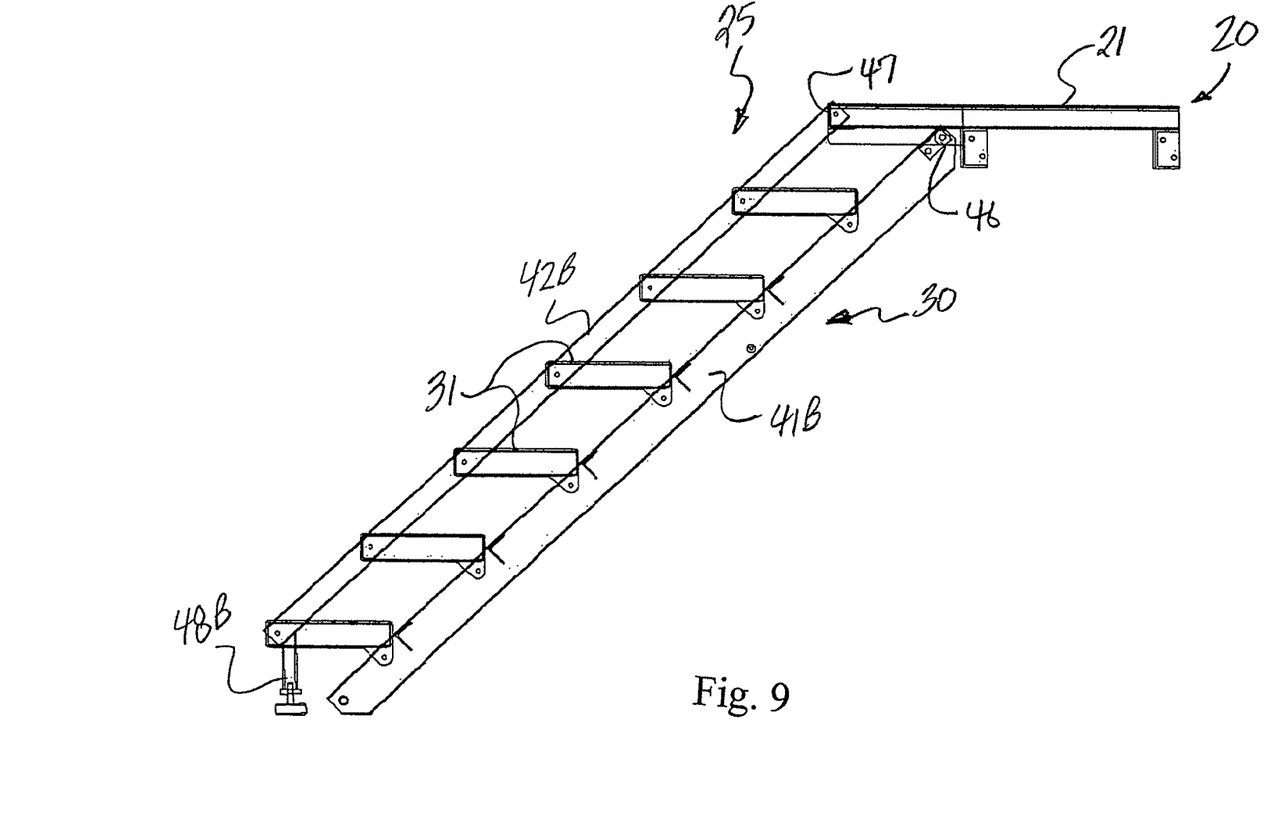

FIGS. 7, 8, and 9 demonstrate simultaneous articulation of the foot treads 31 upon movement of the convertible stairway 25 between the stowed and deployed conditions. As shown in FIG. 7, in the stowed condition, the foot treads 31 of the stairway 25 cooperate to define a substantially flat, continuous, and integrated portion 21A of the deck surface 21, as previous described. As the stairway 25 is gradually lowered, the tread adjustment rails 42A, 42B pivot the foot treads 31 in unison relative to the tread support rails 41A, 41B, thereby maintaining each foot tread 31 in a substantially horizontal orientation. See FIG. 8. The offset spacing of pivot connecting points 46, 47 enable substantially precise angular adjustment of each foot tread 31 as the stairway 25 continues to lower from the deck surface 21 to a deployed condition, such as that shown in FIG. 9. In this implementation, the stairway 25 may be lowered to rest at any selected angle relative to the platform 26 or other support carried on the platform 26, while the series of foot treads 31 remain horizontal. As such, the vertical distance between the deck 20 and platform 26 (or other support carried on the platform) may be modified as desired without sacrificing any advantages of a horizontally-treaded stairway 25 for transferring personnel between elevations.

In alternative exemplary embodiments, the convertible stairway may be designed to mechanically lift from the elevated deck surface to a higher elevation, or may be mounted to the platform and designed to mechanically lift to the elevated deck. Additionally, the present deck deployment system may be utilized separate and apart from the tactical vehicle as a means to facilitate transfer of personnel between any spaced elevations. All components and assemblies of the vehicle and system described herein may be interconnected using any suitable hardware, such as pivot pins, bolts, nuts, brackets, screws, or the like, and other means, such as welding and self-locking joints.

Exemplary embodiments of the present invention are described above. No element, act, or instruction used in this description should be construed as important, necessary, critical, or essential to the invention unless explicitly described as such. Although only a view of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. In combination with a tactical vehicle comprising a cab portion located at a front of the vehicle and a vehicle bed located at a rear of the vehicle, the vehicle bed comprising a base platform, a deck deployment system adapted to facilitate transfer of personnel between spaced elevations, said deck deployment system comprising:

an elevated personnel deck and defining a deck surface for supporting personnel, said deck surface extending substantially from the front of said vehicle to the rear of said vehicle, and said personnel deck comprising a pivoted front deck section extending directly over and above the cab portion of said vehicle and a fixed-elevation rear deck section located directly over and above said base platform, the front deck section designed to elevate relative to and independent of the rear deck section;

a convertible stairway hinged to the rear deck section of said personnel deck and adapted for movement independent of the front and rear deck sections between a stowed condition and a deployed condition, said convertible stairway comprising an adjustable frame assembly and a series of articulating horizontally-disposed foot treads carried by said frame assembly, said foot treads remaining substantially horizontal upon movement of said stairway between the stowed condition and the deployed condition, such that:

when said stairway is in the stowed condition, said foot treads integrate with the rear deck section of said personnel deck to form substantially flat and continuous portion of said deck surface; and when said stairway is in the deployed condition, said rear deck section opens to form a personnel deployment passage directly over and above said base platform at the bed of said vehicle, and said foot treads cooperate to form steps extending downwardly from the rear deck section of said personnel deck to said base platform.

2. A tactical vehicle according to claim 1, wherein each of said foot treads defines a substantially planar rectangular surface comprising opposing front and back ends and opposing side ends.

3. A tactical vehicle according to claim 2, wherein said adjustable frame assembly comprises cooperating pairs of laterally-spaced tread support rails and laterally-spaced tread adjustment rails, and each of said foot treads being connected to said tread support rails at opposite side ends of said foot tread proximate the back end of said foot tread, and to said tread adjustment rails at opposite side ends of said foot tread proximate the front end of said foot tread.

4. A tactical vehicle according to claim 1, and comprising a fixed personnel ladder extending between said base platform and said deck.

5. A tactical vehicle according to claim 1, and comprising at least one handrail located at a perimeter of said deck surface.

6. A tactical vehicle according to claim 1, wherein said convertible stairway in the deployed condition forms a central deployment passage in said deck, said deployment passage being entirely surrounded by said deck surface.

7. A tactical vehicle according to claim 1, and comprising a vehicle-mount frame assembly attached to said deck, and mounting said deck on said tactical vehicle.

* * * * *